D. W. HELFRICH.
Washing-Machines.
No. 138,330. Patented April 29, 1873.
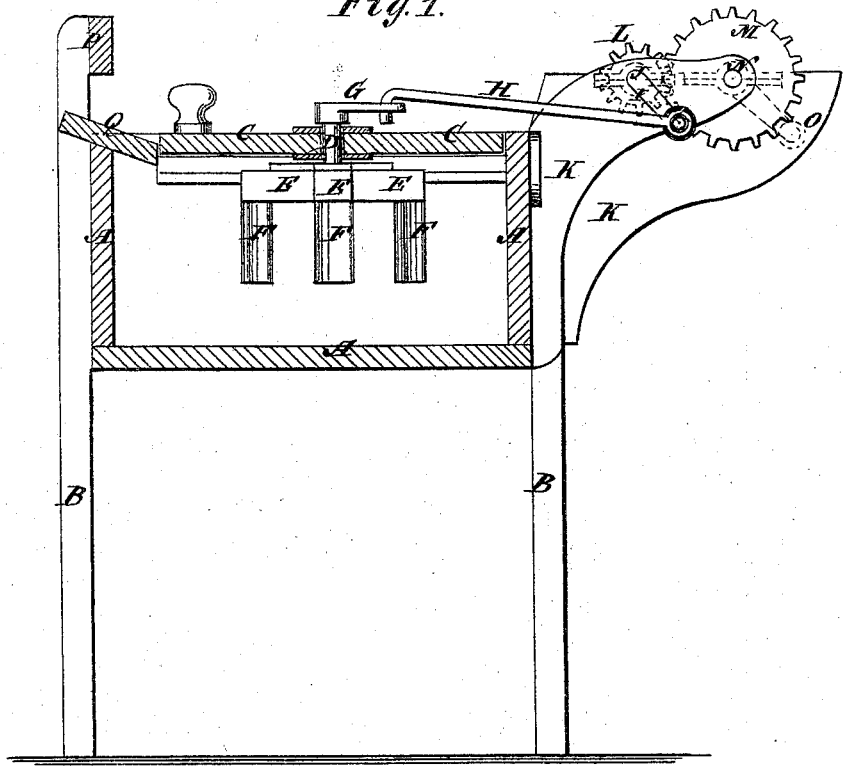
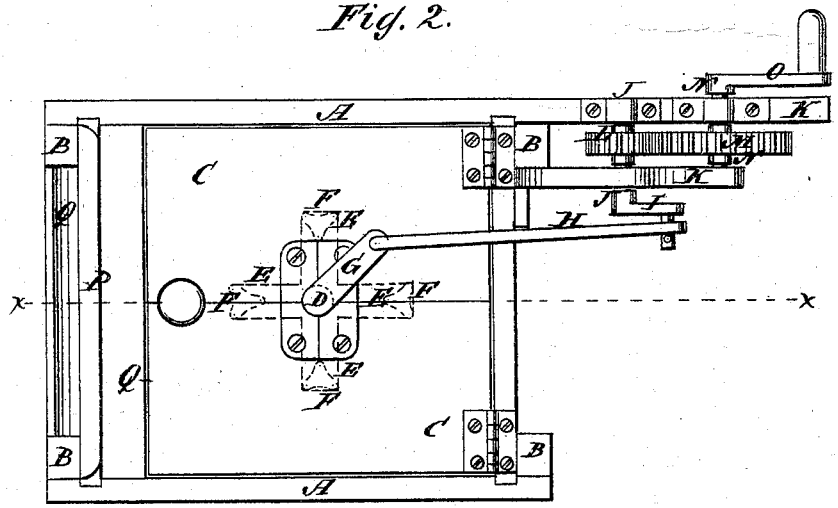
Witnesses:
E. Wolff.
O. Sedgwick
Inventor:
D. W. Helfrich
Per
Attorneys.

UNITED STATES PATENT OFFICE.

DANIEL W. HELFRICH, OF CORRY, PENNSYLVANIA.

IMPROVEMENT IN WASHING-MACHINES.

Specification forming part of Letters Patent No. 138,330, dated April 29, 1873; application filed April 5, 1873.

*To all whom it may concern:*

Be it known that I, DANIEL W. HELFRICH, of Corry, in the county of Erie and State of Pennsylvania, have invented a new and useful Improvement in Washing-Machine, of which the following is a specification:

Figure 1 is a vertical section of my improved machine taken through the line $x\, x$, Fig. 2. Fig. 2 is a top view of the same.

Similar letters of reference indicate corresponding parts.

My invention has for its object to furnish an improved washing-machine, simple in construction, convenient in use, effective in operation, and inexpensive in manufacture, being so constructed that a child can operate it, and which will not tear or injure the clothes. The invention consists in the shaft, the cross-bars, the arms, the crank, the connecting-rod, the crank, the brackets, the gear-wheels, and the crank, constructed and arranged to operate in connection with the cover of the box, as hereinafter fully described.

A represents the box of the machine, which may be made square for convenience in manufacture, or which may be made of any desired form. The box A is supported upon legs B, of such a length as to raise the machine to a convenient height. C is the cover, which rests upon cleats attached to, or rabbets formed in, the upper edges of the sides of the box A. D is a short shaft, which works in bearings in the center of the cover C, and to the lower end of which are attached the centers of two bars, E, which cross each other at right angles, and to the ends of which are attached downwardly-projecting arms F. To the upper end of the shaft D is attached, or upon it is formed a short crank, G, in the end of which is formed a hole to receive a hook formed upon the end of the connecting-rod H, the other end of which is pivoted to a short crank, I, which is made shorter than the crank G, so that a revolution of the crank I will give a reciprocating movement to the crank G, and consequently to the arms E F. The crank I is formed upon or attached to the shaft J, which revolves in bearings in the brackets K attached to the side of the box A. To the shaft J is attached a small gear-wheel, L, the teeth of which mesh into the teeth of the larger gear-wheel M attached to the shaft N. The shaft N revolves in bearings in the brackets K, and to one of its ends is attached a crank, O, by means of which the machine is operated. One of the brackets, K, may be of iron and the other of wood, or both may be of iron or both of wood, as may be desired. Two of the legs B, upon the opposite side of the machine from the gearing, project upward, and to them is attached a board, P, to receive the wringer. The water from the wringer falls upon an inclined board or apron, Q, and runs back into the box A.

By this construction, by simply unhooking the rod H from the crank G, the cover C and its attachments may be turned back out of the way for convenience in putting in and taking out the clothes.

Having thus described my invention, I claim as new and desire to secure by Letters Patent—

The shaft D, cross-bars E, arms F, crank G, connecting-rod H, crank I, brackets K, gear-wheels L M, and crank O, constructed and arranged to operate in connection with the cover C of the box A B, substantially as herein shown and described.

DANIEL WANNER HELFRICH.

Witnesses:
F. G. SAXTON,
J. BUTTON.